United States Patent [19]
Sudau

[11] Patent Number: 5,839,560
[45] Date of Patent: Nov. 24, 1998

[54] FRICTION CLUTCH WITH A DETACHABLY FASTENED CLUTCH HOUSING

[75] Inventor: Jörg Sudau, Niederwerrn, Germany

[73] Assignee: Fichtel & Sachs AG, Schweinfurt, Germany

[21] Appl. No.: 666,900

[22] Filed: Jun. 20, 1996

[30] Foreign Application Priority Data

Jun. 21, 1995 [DE] Germany .......................... 195 22 458.2

[51] Int. Cl.⁶ .................................................. F16D 13/50
[52] U.S. Cl. .................................... 192/70.27; 192/70.16; 192/89.23; 192/112
[58] Field of Search ............................. 192/70.27, 70.16, 192/89.23, 112; 403/326, 327, DIG. 7

[56] References Cited

U.S. PATENT DOCUMENTS

| | | | |
|---|---|---|---|
| 3,785,466 | 1/1974 | Murai et al. ....................... | 192/70.27 X |
| 4,760,906 | 8/1988 | Flotow et al. ..................... | 192/70.27 X |
| 5,067,602 | 11/1991 | Flotow et al. ......................... | 192/70.27 |

FOREIGN PATENT DOCUMENTS

| | | |
|---|---|---|
| 8509183 | 8/1985 | Germany . |
| 3626118 | 2/1988 | Germany . |
| 3802955 | 9/1988 | Germany . |
| 1125908 | 9/1968 | United Kingdom . |
| 2175655 | 12/1986 | United Kingdom . |
| 2191832 | 12/1987 | United Kingdom . |
| 2248476 | 4/1992 | United Kingdom . |
| 8606805 | 11/1986 | WIPO . |

*Primary Examiner*—Charles A. Marmor
*Assistant Examiner*—Saúl J. Rodríguez
*Attorney, Agent, or Firm*—Nils H. Ljungman and Associates

[57] ABSTRACT

A friction clutch, in particular for motor vehicles, with a clutch housing which can be detachably connected to a centrifugal mass of an internal combustion engine, and a clutch disc, pressure plate and clutch mainspring located inside the clutch housing whereby the centrifugal mass and the clutch housing come into contact in the axial direction. A spring supplies the retaining force between the centrifugal mass and the clutch housing. The spring which applies the retaining force is advantageously a plate spring. As a result of this configuration, the clutch housing can easily be assembled to the centrifugal mass by snapping it on.

18 Claims, 5 Drawing Sheets

FRICTION CLUTCH WITH A DETACHABLY FASTENED CLUTCH HOUSING

BACKGROUND OF THE INVENTION

1. Field of the Invention

The present invention generally relates to a friction clutch, in particular for motor vehicles, with a clutch housing which can be detachably connected to a centrifugal mass of an internal combustion engine, and clutch disc, pressure plate and clutch mainspring which are located inside the clutch housing, whereby the centrifugal mass and the clutch housing come into contact in the axial direction.

2. Background Information

A similar known friction clutch is described, for example, in German Patent Publication Published for Opposition Purposes No. 36 26 118, which corresponds to U.S. Pat. No. 4,811,826. During assembly, the connection between the clutch housing and the centrifugal mass is made by a relative rotation of both parts, whereby the clutch housing, by means of appropriately shaped tabs, surrounds webs on the flywheel, and thus provides the axial support. The non-rotational connection is made by means of dowel pins which are driven into holes provided for the purpose, and during disassembly can be either extracted or driven out of the holes.

The purpose of connecting the clutch housing to the centrifugal mass in a detachable manner is so that wear parts, such as the clutch disc which is provided with the friction lining, can be replaced economically. For this purpose, the document cited hereinabove also discloses the connection of the clutch housing to the centrifugal mass by means of screws which are provided on the periphery. The centrifugal mass is preferably pot-shaped, to achieve the maximum possible outside radius for the clutch disc.

The action of tightening the screws or driving in the dowel pins represents an additional working step beyond the axial attachment of the clutch housing to the centrifugal mass. The radial space for the clutch disc is also reduced by the space required for the holes in the flywheel and in the clutch housing.

OBJECT OF THE INVENTION

The object of the present invention is therefore to improve a friction clutch, as known, so that without modifying its overall dimensions, a larger friction surface can be made available, as well as a faster installation process.

SUMMARY OF THE INVENTION

The present invention teaches that the known problem, as described hereinabove, can essentially be solved by means of a spring which applies the retaining force between the centrifugal mass and the clutch housing.

As a result of this configuration, the drilled holes which are presently necessary, both in the centrifugal mass and in the clutch housing, can essentially be completely eliminated. Not only can the costs of manufacturing these components thereby be reduced, but the radial space which has been used in the past for the drilled holes can now be made available to increase the size of the friction surface.

If the spring is a plate spring, the retaining forces are applied in a manner which is distributed uniformly over the periphery.

The assembly and installation process can be made significantly easier if the clutch housing is provided with at least one forward web which is bent radially inward, and at least one rear web which is bent radially inward, whereby the forward web can be shorter than the rear web, the centrifugal mass preferably has a forward radial shoulder and a rear radial shoulder, whereby the rear radial shoulder can be provided with recesses which are distributed over the periphery, the forward radial shoulder can be overlapped axially by the forward web, and the plate spring is preferably supported on the radial outside on the forward web of the clutch housing and on the radial inside on the rear shoulder of the centrifugal mass.

To assemble or install a preferred embodiment of the friction clutch, the plate spring can be placed on the centrifugal mass or in a peripheral, groove in the centrifugal mass. The clutch housing can be moved axially toward the centrifugal mass, whereby the forward radial web can run over the relaxed plate spring. The rear radial web, which can be radially longer than the front radial web, can come into contact with the plate spring and can snap the plate spring as axial movement of the clutch housing continues, until the plate spring can fall into the position in which the plate spring would be under tension. Since when a plate spring is under tension, its projection on its center axis is elongated, the plate spring then can come into contact by means of its radially outer end against the inside of the forward web, and the plate spring can be supported with its radially inner side against the inside of the inner shoulder on the centrifugal mass, and thereby can apply the retaining force which would act in the axial direction.

That is to say, that when a force is applied to a plate spring in such a way that the direction of the applied force is a direction which is away from the base and toward the conical projection of the plate spring, the conical projection is elongated along the longitudinal axis of the plate spring. Alternatively, if the direction of the applied force is from the conical projection toward the base, the conical projection along the longitudinal axis would be shorter, yet the plate spring would still be under tension.

The radially outer edge of the plate spring can contact the inside of the forward web, and the radially inner edge of the plate spring can be supported against the inside of the inner shoulder on the centrifugal mass, and the applied force would act in the axial direction.

Since the fastening of the clutch housing can preferably be basically accomplished by a simple snap-on process, the installation can be significantly facilitated, and the time required for installation can be significantly reduced. The disassembly of the clutch can be correspondingly easy, since the clutch housing only needs to be pulled off the centrifugal mass by applying an extraction force which is greater than the force of the spring. If the plate spring is correspondingly thick, it can also apply the force required for the transmission of torque in addition to the axial retaining force.

In an additional advantageous embodiment, the forward shoulder of the centrifugal mass is stepped and can form an axial contact surface for the forward ring web. The clutch housing can then be centered by means of the step or the forward ring web, which can further facilitate the assembly and installation process.

If the forward shoulder of the centrifugal mass also has external toothing and the forward web of the clutch housing has a corresponding internal toothing, the torque can be transmitted by means of the toothing, and the spring plate need only apply the axial retaining force. Likewise it is possible to provide a plurality of radial forward webs over the periphery, which correspond to correspondingly-shaped recesses in the forward shoulder of the centrifugal mass. If the webs and the recesses coincide, the clutch housing can be moved axially toward the centrifugal mass, and by rotation in the peripheral direction, the web extensions can be brought into contact with the centrifugal mass, so that the torque can thereby be transmitted.

In accordance with an embodiment of the present invention, if the webs are realized in a ring shape, there is only a single forward or rear web in the clutch housing. While the forward web can be formed by a deformation process, the rear ring web must be connected to the clutch housing in a joining process (welding, soldering, etc.). It can be advantageous if there are a plurality of partial ring-shaped webs which can be bent out of the pressure plate housing.

The embodiments of the present invention discussed hereinabove will be described further below with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

In summary, one aspect of the present invention resides broadly in a friction clutch assembly, such as for a transmission for a motor vehicle, the friction clutch assembly comprising: a flywheel assembly, the flywheel assembly having an axis of rotation and defining an axial direction parallel to the axis of rotation; the flywheel assembly having a circumference disposed concentrically about the axis of rotation; a clutch housing; a clutch disc; a pressure plate; a clutch mainspring; the clutch disc, the pressure plate, and the clutch mainspring being disposed substantially within the clutch housing; the clutch disc being disposed axially between the pressure plate and the flywheel assembly; the clutch mainspring being disposed adjacent the pressure plate and axially opposite the clutch disc; the clutch housing being disposed adjacent the pressure plate; means for attaching the flywheel assembly to the clutch housing; and the means for attaching comprising spring means.

Another aspect of the present invention resides broadly in a friction clutch, the friction clutch comprising: a flywheel assembly, the flywheel assembly having an axis of rotation and defining an axial direction parallel to the axis of rotation; the flywheel assembly having a circumference disposed concentrically about the axis of rotation; a clutch housing; a clutch disc; a pressure plate; a clutch mainspring; the clutch disc, the pressure plate, and the clutch mainspring being disposed substantially within the clutch housing; the clutch disc being disposed axially between the pressure plate and the flywheel assembly; the clutch mainspring being disposed adjacent the pressure plate and axially opposite the clutch disc; the clutch housing being disposed adjacent the pressure plate; means for attaching the flywheel assembly to the clutch housing; and the means for attaching comprising spring means.

BRIEF DESCRIPTION OF THE DRAWINGS

Several embodiments of the present invention are explained in greater detail below and illustrated in the accompanying drawings, in which:

FIG. 3a is an illustration of an additional embodiment as in FIG. 2a;

FIG. 3b is the illustration corresponding to FIG. 2b of the embodiment illustrated in FIG. 3a;

DESCRIPTION OF THE PREFERRED EMBODIMENT

Figure 1:
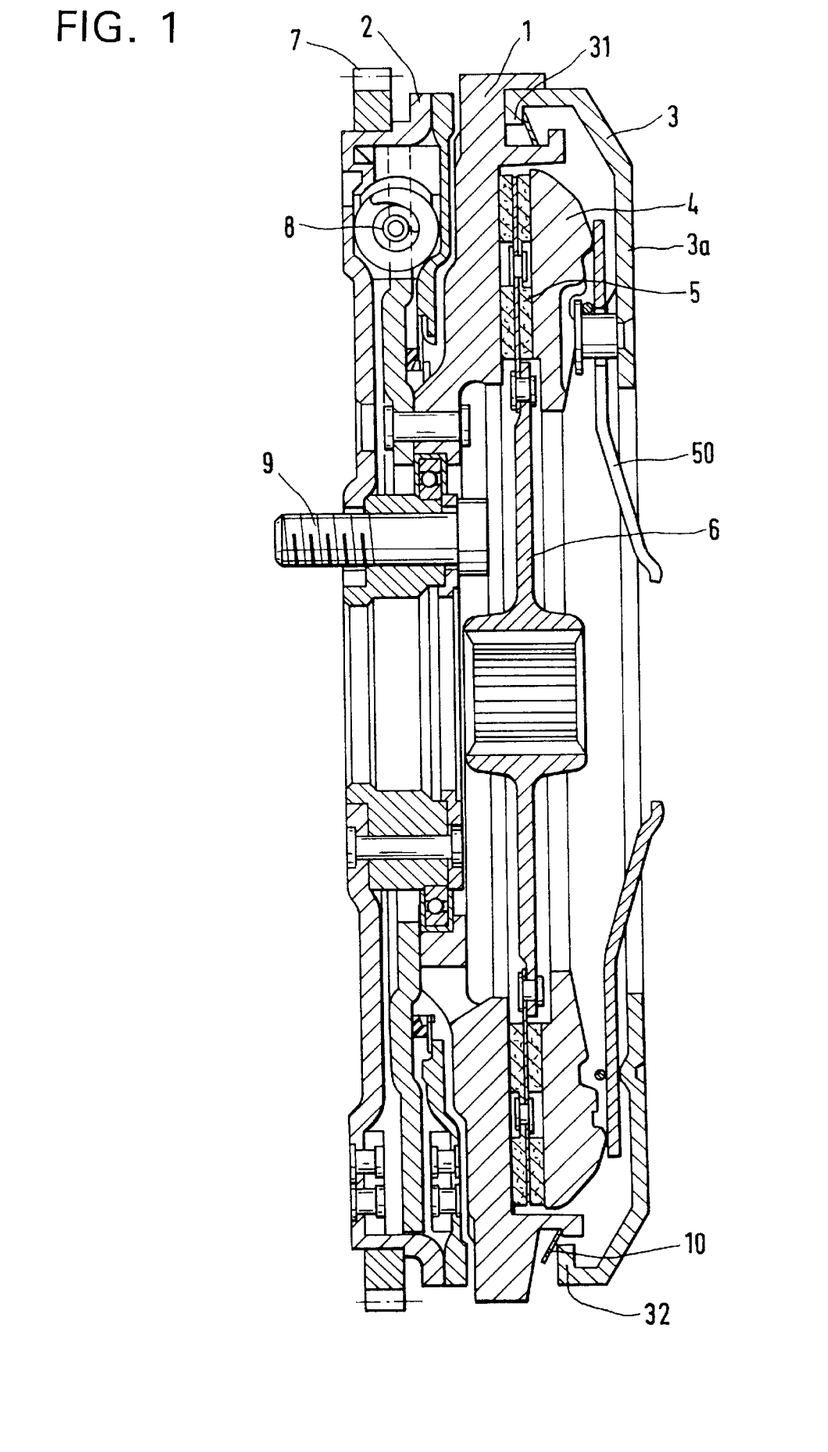
FIG. 1 is a longitudinal section of a friction clutch.

The friction clutch illustrated in FIG. 1 can essentially include the two centrifugal masses 1 and 2, the clutch housing, or pressure plate housing 3 with the pressure plate 4, and the friction lining 5 located between the centrifugal mass 2 and the pressure plate 4, which friction lining 5 can be fastened to the clutch disc 6. The centrifugal mass 2 can carry a starter rim 7, and can also be provided with a torsion suspension system, or cushion 8. By means of screw(s) 9, the centrifugal mass 2 can be fastened to the crankshaft of an internal combustion engine, which is not shown here in any further detail. The function of a clutch of this type is sufficiently well-known that there is no need to go into a more detailed explanation.

The pressure plate housing 3 is realized essentially in the shape of a pot, and the end of the pressure plate housing 3 facing the second centrifugal mass 1 can be provided with webs 31, 32 which can project radially inward. The pressure plate housing 3 can be connected to the second centrifugal mass 1 by means of the plate spring 10. The webs 31, 32 are realized in the form of partial ring webs distributed uniformly around the periphery. Therefore, in the sectional drawing shown here, only the forward web 31 is visible in the upper half and only the rear web 32 is visible in the lower half.

The actual connection of the pressure plate 3 to the centrifugal mass 1 is illustrated in more detail in FIGS. 2 to 5, to which reference is made below.

Figure 2A:
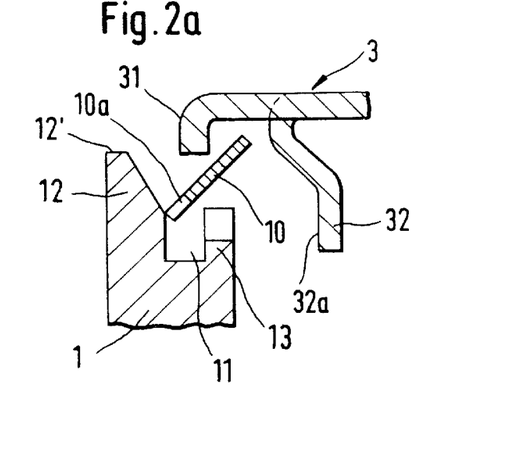
FIG. 2a is a detail of the embodiment illustrated in FIG. 1 during the assembly of the clutch.
Figure 2B:
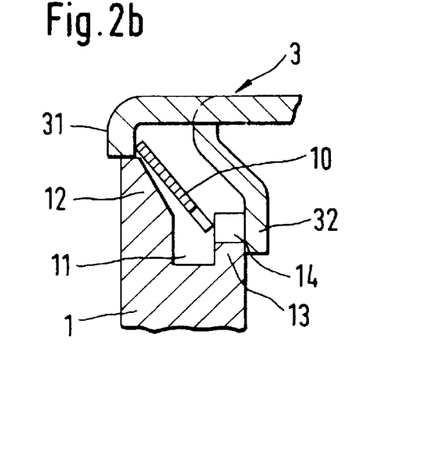
FIG. 2b is a detail of the embodiment illustrated in FIG. 2a when installed.
Figure 3A:
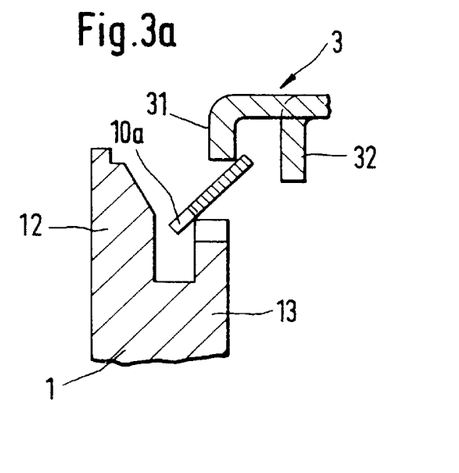
Figure 3B:
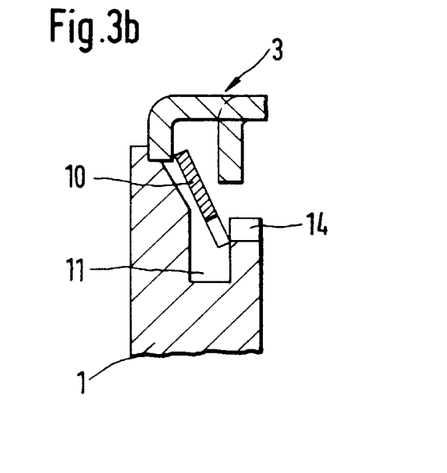

The centrifugal mass 1 can be provided on the radial outside with an encircling groove 11, which encircling groove 11 can make a transition on both sides axially into a forward shoulder 12 and a rear shoulder 13 (shown in FIGS. 2a and 2b). The forward shoulder 12 is realized on the axially inner side, in relation to the clutch housing 3, so that the forward shoulder 12 can make an angled transition to the groove 11. The rear shoulder 13 can have recesses 14 which can be distributed uniformly over the periphery. The plate spring 10 can be slotted, and can have recesses 10a (shown in FIGS. 2a and 3a) in its radially inner area.

The clutch housing 3 can be provided with partial ring webs 31 and 32 which can extend radially inward and can be distributed uniformly over the periphery, and which webs 31 and 32 can be bent, for example, out of the material of the clutch housing 3. The forward web 31 can be shorter than the rear web 32, which rear web 32 can be curved as shown in FIGS. 2a and 2b, toward the base 3a (shown in FIG. 1) of the clutch housing 3. The rear web 32 can have a flat contact surface 32a on its radially inner area. To assemble the friction clutch, the plate spring 10 can be inserted with the recesses 10a over the webs of the rear shoulder 13, which webs are adjacent to the recesses 14, into the groove 11 of the centrifugal mass 1, and the plate spring 10 can be rotated circumferentially so that the recesses 10a, 14 are alternately offset with respect to one another to retain the plate spring 10 in the groove 11. The clutch housing 3 can be displaced axially toward the centrifugal mass 1, whereby the forward radial web 31 can pass over the radially outer area of the plate spring 10 and can be guided radially on the ring-shaped area 12' (shown in FIG. 2a) of the forward shoulder 12. Simultaneously, the rear web 32 can come into contact with the plate spring 10, and can snap the plate spring 10 to the left in the drawing, as a result of which the pressure plate housing 3 can be pushed into an axial limit position by the force of the plate spring 10 until the contact surface 32a moves against the corresponding mating surface on the shoulder 13. In this limit position (shown in FIG. 2b), the radially outer area of the plate spring 10 can be supported against the web 31 and the radially inner area of the plate spring 10 can be supported against the rear shoulder 13 of the webs adjacent to the recesses In the embodiment illustrated in FIGS. 3a and 3b, the clutch housing 3 can be fixed in place axially on the stepped forward shoulder 12 (also shown in FIGS. 6a and 6b, and discussed in relation to FIGS. 6a and 6b) of the centrifugal mass 1. The assembly is similar to the procedure described for the preceding embodiment. As a result of this configuration, the rear radial webs 32 of the clutch housing 3 can be realized in a simpler manner.

It is not absolutely necessary to realize slots in the plate spring 10. Even as recesses 10a in the plate spring 10 are not absolutely necessary, recesses 14 in the centrifugal mass 1 are not absolutely necessary. If the components in question are manufactured with appropriately close tolerances, the plate spring 10 can also be inserted into the groove 11. The recesses 10a, 14 can naturally significantly facilitate the assembly process. The rear web 32 of the clutch housing 3 can be omitted if recesses (not shown) are provided in the vicinity of the base 3a of the clutch housing 31 which recesses can make it possible to move the spring plate 10 using a tool, when the web 31 has passed over the spring plate 10.

Figure 4:
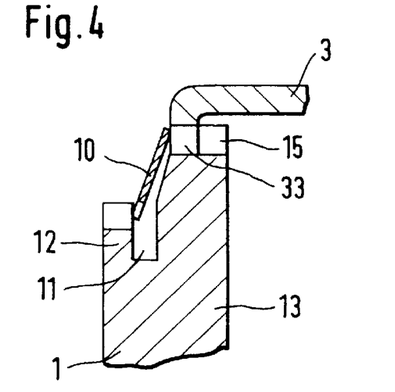
FIG. 4 is an illustration of a detail of an additional embodiment when installed.

In the embodiment illustrated in FIG. 4, the pressure plate housing 3 can be fastened to the centrifugal mass 1 outside the clutch housing 3. The web 31 (shown in FIGS. 2a, 2b, 3a) can be provided with rough, coarse, or large internal toothing 33 and the centrifugal mass 1 with rough external toothing 15. Corresponding to the toothing, the clutch housing 3 can be pushed over the centrifugal mass 1 and rotated in the peripheral direction so that the teeth 33, 15 can be in contact with one another. The plate spring 10 lying in the groove 11 can be snapped, so that it can push the pressure plate housing 3 axially against the centrifugal mass 1. The force to be generated by the plate spring 10 is a function of the torque required, which the clutch housing 3 essentially must transmit to the clutch disc 6 (shown in FIG. 1), if there are no stops in the peripheral direction.

Figure 5:
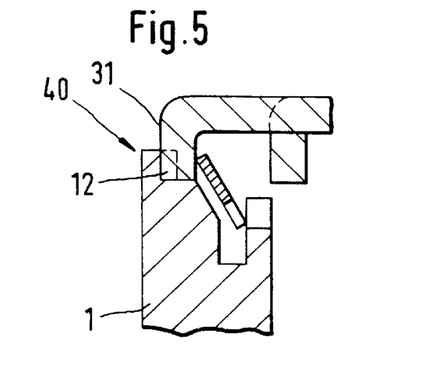
FIG. 5 is an illustration of a detail of an additional embodiment when installed.

As shown in FIG. 5, there can be toothing 40 between the forward web 31 and the forward shoulder 12 of the centrifugal mass 1 to introduce the torque into the clutch housing 3.

Figure 6A:
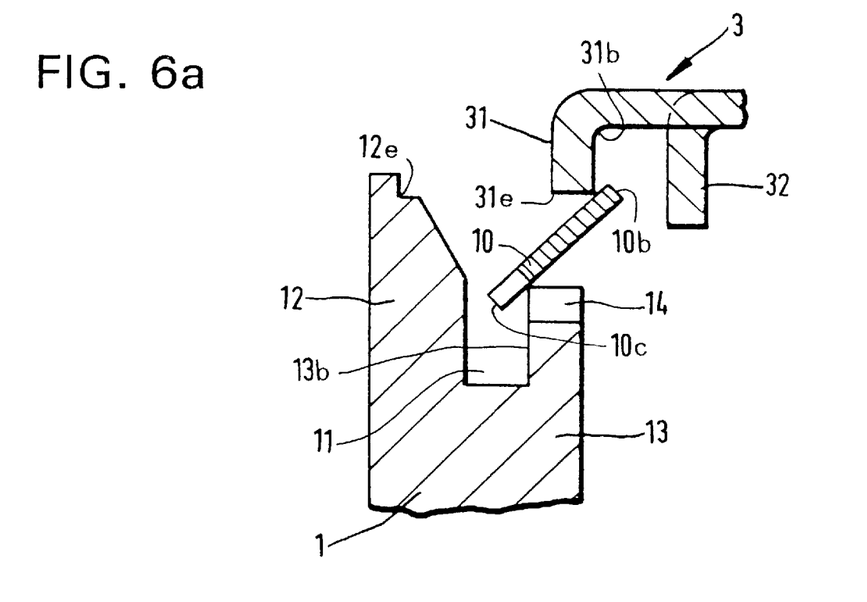
FIGS. 6a and 6b are essentially the same as FIGS. 3a and 3b, but are more detailed.
Figure 6B:
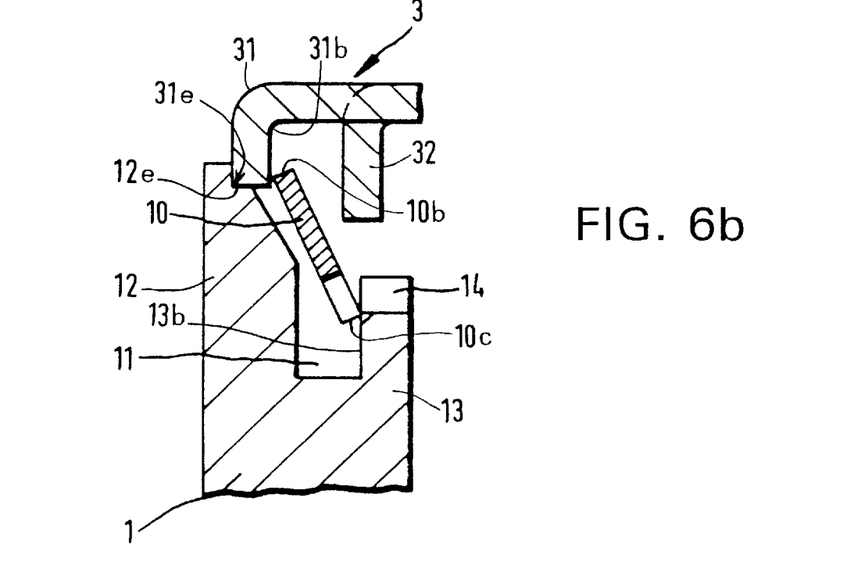

In the embodiment illustrated in FIGS. 6a and 6b, the clutch housing, or pressure plate housing 3, by means of end 31e of the web 31, can be axially fixed in place on the stepped portion 12e of forward shoulder 12 of the centrifugal mass 1.

FIGS. 6a and 6b essentially illustrate an assembly and installation process of an embodiment of the present invention. As stated further above, the assembly and installation process can essentially be made easier if the clutch housing 3 is provided with at least one forward web 31 which is bent radially inward, and at least one rear web 32 which is bent radially inward. The forward web 31 can be shorter than the rear web 32. The centrifugal mass 1 can have a forward radial shoulder 12 and a rear radial shoulder 13. The rear radial shoulder 13 can be provided with recesses 14. The recesses 14 can be distributed over the circumference of the rear radial shoulder 13 of the centrifugal mass 1. The forward web 31 can axially overlap the forward radial shoulder 12, and the plate spring 10 can be supported radially outwardly on the forward web 31 of the clutch housing 3 and radially inwardly on the rear shoulder 13 of the centrifugal mass 1, as shown in FIG. 6a.

To assemble or install the friction clutch, the plate spring 10 can be placed on the centrifugal mass 1 or in a groove 11 running circumferentially around the centrifugal mass 1. The clutch housing 3 can be moved axially toward the centrifugal mass 1, and the forward web 31 can run over the relaxed plate spring 10, as shown in FIG. 6a. The rear radial web 32 can be radially longer than the front radial web 31. The rear radial web 32 can contact the plate spring 10 and can snap the plate spring 10 as movement of the clutch housing 3 continues in the axial direction; the plate spring 10 can then fall into position, as shown in FIG. 6b, in which position the plate spring 10 would be under tension. The plate spring 10 can be supported with its radially inner end 10c against the inside 13b of the rear shoulder 13 on the centrifugal mass 1. The plate spring 10 can thereby apply the retaining force which would act axially between the centrifugal mass 1 and the clutch housing 3, as depicted in FIG. 6b.

Since the fastening of the clutch housing 3 can be basically accomplished by a simple snap-on process, as described hereinabove, the installation can be significantly facilitated, and installation time can be significantly reduced. The disassembly of the clutch can be correspondingly easy, since the clutch housing 3 simply needs to be pulled off the centrifugal mass 1 by applying an extraction force which is greater than the force of the plate spring 10. If the plate spring 10 is correspondingly thick, it can also apply the force required for the transmission of torque in addition to the axial retaining force, as described further above.

Figure 6C:
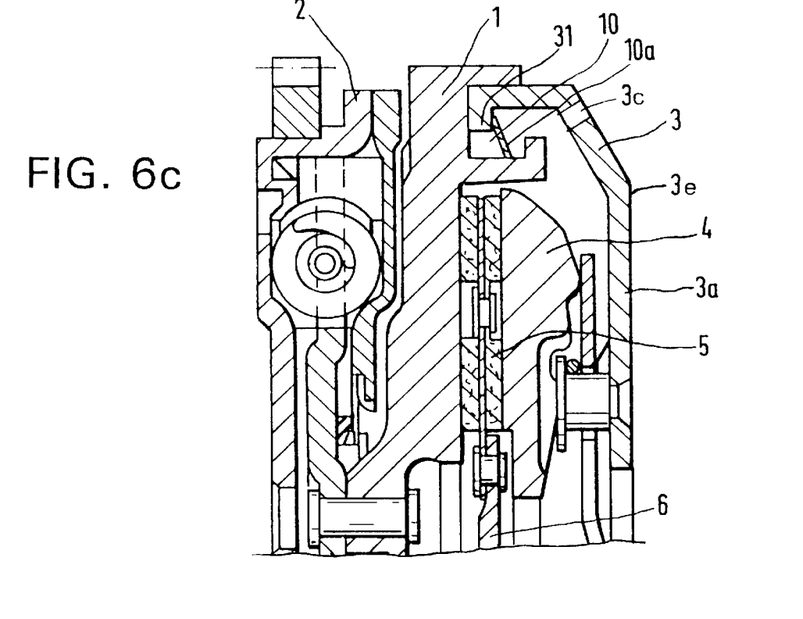
FIG. 6c is an illustration of an additional embodiment of the present invention.
Figure 6D:
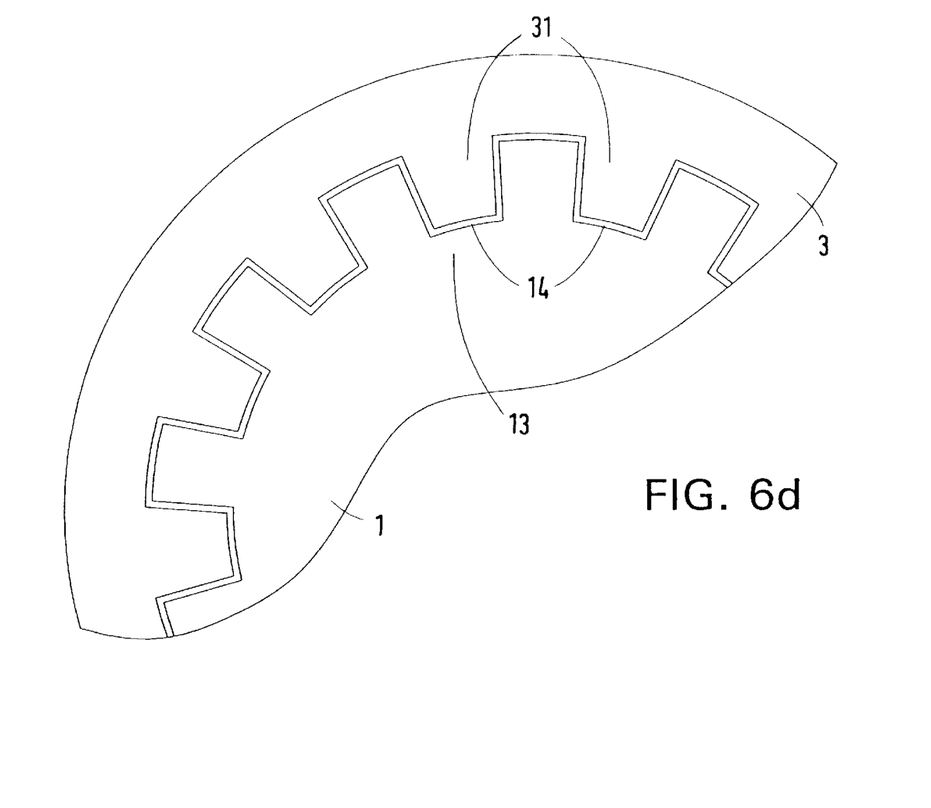
FIG. 6d is an illustration of an additional embodiment of the present invention.

In accordance with at least one embodiment of the present invention, it can be possible to provide a plurality of forward webs, or tabs 31 over the circumference of the clutch housing 3 (as shown in FIG. 6d). A plurality of forward webs, or tabs 31 can correspond to recesses 14 in the rear shoulder 13 of the centrifugal mass 1. The webs 31 and the recesses 14 can be configured to coincide and the clutch housing 3 can be moved axially toward the centrifugal mass 1. By rotation in the circumferential direction, the forward webs 31 can be brought into contact with the forward shoulder 12 of the centrifugal mass 1 (as shown in FIG. 6b), so that the torque can thereby be transmitted. The recesses 14, of course, can also be larger than indicated in FIG. 6d, in order that there can be some clearance, or play in the recesses 14 to facilitate assembly of the clutch housing 3 to the centrifugal mass 1.

In the embodiment illustrated in FIG. 6c, the plate spring 10 is provided with slots, or recesses 10a. Also shown are the two centrifugal masses 1 and 2, the clutch housing 3 with the pressure plate 4, the clutch disc 61 and the friction linings 5, which friction linings 5 can be fastened to the clutch disc 6. The end of the clutch housing 3 can be provided with the forward web 31. The wall 3e of the base 3a of the clutch housing 3, in this case, can be provided with recesses 3c. This construction can make it possible to insert a tool (not shown) through the recesses 3c, grasp the plate spring 10 by means of a recess 10a in the plate spring 10, and thereby snap the plate spring 10 into position after the web 31 has passed over the plate spring 10. The recesses 3c, of course, can be suitably positioned elsewhere in the base 3a of the clutch housing 3.

In accordance with at least one embodiment of the present invention, FIG. 6d shows a plurality of forward webs, or tabs 31 on the circumference of the clutch housing, or pressure plate housing 3. The tabs 31, as shown, can correspond to recess 14 in the rear shoulder 13 of the centrifugal mass 1. The recesses 14 and the webs 31 can be configured to substantially align with one another, as shown. This configuration can allow the clutch housing 3 to be moved axially past the shoulder 13 and toward the centrifugal mass 1.

Figure 7:
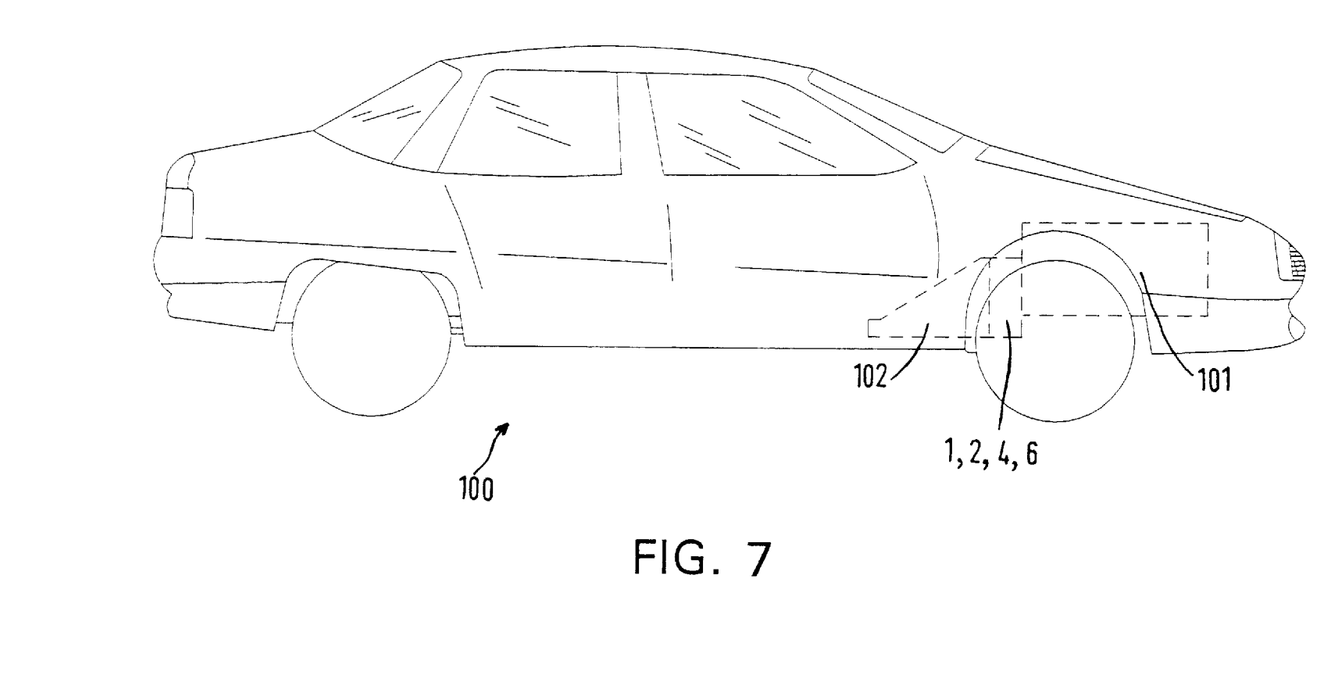
FIG. 7 shows a typical automobile in which the present invention may be incorporated.

FIG. 7 shows what could be considered to be a typical automobile 100, which automobile 100 typically includes an internal combustion engine 101, preferably mounted in the forward portion thereof. The automobile 100 could also typically include a transmission 102 for transmitting mechanical power from the engine 101 to the wheels. If the automobile 100 has a manual transmission 102, the centrifugal masses 1 and 2, pressure plate 4, and clutch disc 6 of the present invention may also be included, for engaging the transmission 102 with the engine 101.

In accordance with at least one embodiment of the present invention, the plate spring 10, shown in FIGS. 1–5, can be a Belleville spring, particularly a frustoconical Belleville spring.

Belleville springs are readily available from many sources, who both design and manufacture such Belleville springs. An example of a manufacturer of Belleville springs is E. C. Styberg Engineering Co., Inc. of Racine, Wis. There are a number of other companies also found in the Thomas register from which Belleville springs are also available.

One feature of the invention resides broadly in the friction clutch, in particular for motor vehicles, with a clutch housing 3 which can be detachably connected to a centrifugal mass 1 of an internal combustion engine, and clutch disc 6, pressure plate 4 and clutch mainspring 50 which are located inside the clutch housing 3, whereby the centrifugal mass 1 and the clutch housing 3 come into contact in the axial direction, characterized by the fact that a spring 10 supplies the retaining force between the centrifugal mass 1 and the clutch housing 3.

Another feature of the invention resides broadly in the friction clutch characterized by the fact that the spring 10 is a plate spring.

Yet another feature of the invention resides broadly in the friction clutch characterized by the fact that the clutch housing 3 is provided with at least one forward web 31 which is bent radially inward, and at least one rear web 32 which is bent radially inward, whereby the forward web 31 is shorter than the rear web 32, that the centrifugal mass 3 has a forward and a rear radial shoulder 12, 13, whereby the rear radial shoulder 13 is provided with recesses 14 distributed over the periphery, the forward radial shoulder 12 is axially overlapped by the forward web 31, that the plate spring 10 is supported on the radial outside on the forward web 31 of the clutch housing 3 and on the radial inside on the rear shoulder 13 of the centrifugal mass 1.

Still another feature of the invention resides broadly in the friction clutch characterized by the fact that the clutch housing 3 is provided with at least one forward web 31 which is bent radially inward, that the centrifugal mass 1 has a forward and a rear radial shoulder 12, 13, whereby the rear radial shoulder 13 is provided with recesses 14; external toothing 15 distributed over the periphery, and the plate spring 10 is located in a groove 11 in the centrifugal mass 1, whereby the groove 11 is provided either outside the clutch housing 3, or the base area 3a of the clutch housing 3 has recesses, by means of which an accessory (a tool) can be used to shift the plate spring 10 from its relaxed position into the position in which it is under tension.

A further feature of the invention resides broadly in the friction clutch characterized by the fact that the forward shoulder 12 of the centrifugal mass 1 is stepped, and forms an axial contact surface for the forward web 31.

Another feature of the invention resides broadly in the friction clutch characterized by the fact that the plate spring 10 is slotted.

Yet another feature of the invention resides broadly in the friction clutch characterized by the fact that the forward shoulder 12 of the centrifugal mass 1 has external toothing and the forward web 31 of the clutch housing 3 has corresponding internal toothing.

Still another feature of the invention resides broadly in the friction clutch characterized by the fact that in the clutch housing 3 there are a plurality of partial ring webs 31, 32 distributed uniformly over the periphery.

Examples of clutches in which the invention could possibly be utilized may be found in the following documents: U.S. Pat. Nos. 5,476,166; U.S. Patent application Ser. Nos. 08/360455, 08/405139, 08/438709, 08/499305, 08/502401, 08/504848, 08/515263, 08/515348, 08/518789; Federal Republic of Germany DE-OS and DE-PS 43 11 102, DE-OS and DE-PS 43 44 124, DE-OS and DE-PS 44 09 253, DE-OS and DE-PS 44 16 949, DE-OS and DE-PS 44 24 186, DE-OS and DE-PS 195 19 363, DE-OS and DE-PS44 25 570, DE-OS and DE-PS 44 28 832, DE-OS and DE-PS 44 28 829, DE-OS and DE-PS 44 36 110, and DE-OS and DE-PS 44 29 870. All of the above U.S. patent documents in this paragraph are assigned to Fichtel & Sachs AG of the Federal Republic of Germany.

Some examples of clutch assemblies and various components associated therewith which could possibly utilize the present invention may be disclosed in the following U.S. Pat. Nos. 4,684,007, 4,635,780, 4,651,857, 5,103,688, and 4,777,843.

Some examples of transmissions in which the present invention may be incorporated may be disclosed by the following U.S. Pat. Nos. 5,199,316, 4,458,551, and 3,858,460.

Some examples of two-mass flywheels and the components thereof which may incorporate the present invention therein may be disclosed by the following U.S. Pat. Nos. 5,103,688 and 4,777,843.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, are hereby incorporated by reference as if set forth in their entirety herein.

The corresponding foreign patent publication applications, namely, Federal Republic of Germany Patent Application No. 195 22 458.2, filed on Jun. 21, 1995, having inventor Jörg Sudau, and DE-OS 195 22 458.2 and DE-PS 195 22 458.2.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch assembly for a transmission of a motor vehicle, said friction clutch assembly comprising:
    a flywheel assembly, said flywheel assembly having an axis of rotation and defining an axial direction parallel to the axis of rotation;
    said flywheel assembly having a circumference disposed concentrically about the axis of rotation;
    a clutch housing;
    a clutch disc;
    a pressure plate;
    a clutch mainspring;
    said clutch disc, said pressure plate, and said clutch mainspring being disposed substantially within said clutch housing;
    said clutch disc being disposed axially between said pressure plate and said flywheel assembly;
    said clutch mainspring being disposed adjacent said pressure plate and axially opposite said clutch disc;
    said clutch housing being disposed adjacent said pressure plate;
    a plate spring to attach said flywheel assembly to said clutch housing.

2. The friction clutch assembly according to claim 1, wherein:
    said clutch housing comprises a wall, said wall comprising an inner portion and an outer portion;
    said outer portion of said clutch housing being farther from the axis of rotation than said inner portion of said clutch housing;
    said outer portion of said clutch housing being concentric with the axis of rotation;
    said clutch housing comprises at least one web;
    said at least one web having a first end and a second end, said first end and said second end of said at least one web being substantially opposite one another, with respect to one another;
    said first end of said at least one web being disposed on said outer portion of said clutch housing;
    said second end of said at least one web extending substantially radially inwardly from said first end of said at least one web;
    said flywheel assembly comprises an inner portion and an outer portion;
    said outer portion of said flywheel assembly being farther from the axis of rotation than said inner portion of said flywheel assembly;
    said outer portion of said flywheel assembly being concentric with the axis of rotation;
    said flywheel assembly comprises at least one shoulder portion;
    said at least one shoulder portion having a first end and a second-end, said first end and said second end of said at least one shoulder portion being substantially opposite one another, with respect to one another;
    said first end of said at least one shoulder portion being disposed on said outer portion of said flywheel assembly;
    said second end of said at least one shoulder portion extending substantially radially outwardly from said first end of said at least one shoulder portion;
    said at least one shoulder portion having a circumference; and
    said at least one shoulder portion comprises:
        a first shoulder; and
        a second shoulder.

3. The friction clutch assembly according to claim 2, wherein said second shoulder comprises recesses, said recesses being disposed on said circumference of said second shoulder.

4. The friction clutch assembly according to claim 3, wherein:
    said at least one web comprises:
        at least one first web having a length dimension; and
        at least one second web having a length dimension;
    said length dimension of said at least one second web being greater than said length dimension of said at least one first web;
    said second end of said at least one first web being substantially adjacent said second end of said first shoulder;
    said second end of said at least one first web overlaps said second end of said first shoulder along the axial direction;
    said at least one first web comprises a first surface and a second surface, said first surface and said second surface of said at least one first web being disposed substantially opposite one another;
    said second shoulder comprises an inner surface and an outer surface, said inner surface and said outer surface of said second shoulder being disposed substantially opposite one another;
    said inner surface of said second shoulder faces substantially toward said at least one first web;
    said first surface of said at least one first web faces substantially toward said second shoulder;
    said plate spring comprises:
        an inner portion;
        a middle portion; and
        an outer portion;
    said outer portion of said plate spring being farther from the axis of rotation than said inner portion of said plate spring;

said middle portion of said plate spring being located between said inner portion of said plate spring and said outer portion of said plate spring;

said flywheel assembly comprises means for supporting said plate spring;

said outer portion of said plate spring contacting said first surface of said at least one first web;

said inner portion of said plate spring contacting said inner surface of said second shoulder; and said means for supporting said plate spring comprises: said first surface of said at least one first web; and said inner surface of said second shoulder.

5. The friction clutch assembly according to claim 3, wherein:

said second shoulder comprises means for meshing with said second end of said at least one web, said means for meshing being disposed on said circumference of said second shoulder;

said flywheel assembly comprises a groove, said groove being disposed on said outer portion of said flywheel assembly and facing radially outwardly;

said groove being disposed between said first shoulder and said second shoulder; and said plate spring is disposed in said groove.

6. The friction clutch assembly according to claim 5, wherein said groove is disposed substantially outside said clutch housing;

said flywheel assembly comprises means for permitting manipulation of said plate spring;

said wall of said clutch housing comprises apertures; and said apertures are said means for permitting manipulation of said plate spring.

7. The friction clutch assembly according to claim 5, wherein:

said flywheel assembly comprises means for permitting manipulation of said plate spring;

said wall of said clutch housing comprises apertures; and said apertures are said means for permitting manipulation of said plate spring.

8. The friction clutch assembly according to claim 4, wherein:

said second end of said first shoulder comprises means for limiting axial movement of said at least one first web;

said second end of said first shoulder comprises a step-shaped portion for contacting said second end of said at least one first web;

said second end of said at least one first web contacting said step-shaped portion of said first shoulder;

said step-shaped portion of said first shoulder comprises said means for limiting axial movement of said at least one first web;

said first shoulder comprises a first means for meshing;

said at least one first web comprises a second means for meshing;

said first means for meshing and said second means for meshing being in mesh with one another;

said first means for meshing comprises teeth; and said second means for meshing comprises teeth.

9. The friction clutch assembly according to claim 1, wherein said plate spring comprises at least one slot.

10. The friction clutch assembly according to claim 4, wherein:

said first shoulder comprises a first means for meshing;

said at least one first web comprises a second means for meshing; and said first means for meshing and said second means for meshing being in mesh with one another.

11. The friction clutch assembly according to claim 4, wherein:

said at least one first web comprises a plurality of webs; and said at least one second web comprises a plurality of webs.

12. A friction clutch comprising:

a flywheel assembly, said flywheel assembly having an axis of rotation and defining an axial direction parallel to the axis of rotation;

said flywheel assembly having a circumference disposed concentrically about the axis of rotation;

a clutch housing;

a clutch disc;

a pressure plate;

a clutch mainspring said clutch disc, said pressure plate, and said clutch mainspring being disposed substantially within said clutch housing;

said clutch disc being disposed axially between said pressure plate and said flywheel assembly;

said clutch mainspring being disposed adjacent said pressure plate and axially opposite said clutch disc;

said clutch housing being disposed adjacent said pressure plate; and a plate spring to attach said flywheel assembly to said clutch housing.

13. The friction clutch according to claim 12, wherein said plate spring comprises at least one slot.

14. The friction clutch according to claim 12, wherein:

said clutch housing comprises a wall, said wall comprising an inner portion and an outer portion;

said outer portion of said clutch housing being farther from the axis of rotation than said inner portion of said clutch housing;

said outer portion of said clutch housing being concentric with the axis of rotation;

said clutch housing comprises at least one web;

said at least one web having a first end and a second end, said first end and said second end of said at least one web being substantially opposite one another, with respect to one another;

said first end of said at least one web being disposed on said outer portion of said clutch housing;

said second end of said at least one web extending substantially radially inwardly from said first end of said at least one web;

said flywheel assembly comprises an inner portion and an outer portion;

said outer portion of said flywheel assembly being farther from the axis of rotation than said inner portion of said flywheel assembly;

said outer portion of said flywheel assembly being concentric with the axis of rotation;

said flywheel assembly comprises at least one shoulder portion;

said at least one shoulder portion having a first end and a second end, said first end and said second end of said at least one shoulder portion being substantially opposite one another, with respect to one another;

said first end of said at least one shoulder portion being disposed on said outer portion of said flywheel assembly;

said second end of said at least one shoulder portion extending substantially radially outwardly from said first end of said at least one shoulder portion;

said at least one shoulder portion having a circumference;

said at least one shoulder portion comprises:
a first shoulder; and
a second shoulder;

said second shoulder comprises recesses, said recesses being disposed on said circumference of said second shoulder;

said at least one web comprises
at least one first web having a length dimension; and
at least one second web having a length dimension;

said length dimension of said at least one second web being greater than said length dimension of said at least one first web;

said second end of said at least one first web being substantially adjacent said second end of said first shoulder;

said second end of said at least one first web overlaps said second end of said first shoulder along the axial direction;

said at least one first web comprises a first surface and a second surface, said first surface and said second surface of said at least one first web being disposed substantially opposite one another;

said second shoulder comprises an inner surface and an outer surface, said inner surface and said outer surface of said second shoulder being disposed substantially opposite one another;

said inner surface of said second shoulder faces substantially toward said at least one first web;

said first surface of said at least one first web faces substantially toward said second shoulder;

said plate spring comprises:
an inner portion;
a middle portion; and
an outer portion;

said outer portion of said plate spring being farther from the axis of rotation than said inner portion of said plate spring;

said middle portion of said plate spring being located between said inner portion of said plate spring and said outer portion of said plate spring;

said flywheel assembly comprises means for supporting said plate spring;

said outer portion of said plate spring contacting said first surface of said at least one first web;

said inner portion of said plate spring contacting said inner surface of said second shoulder;

said means for supporting said plate spring comprises:
said first surface of said at least one first web; and
said inner surface of said second shoulder;

said first shoulder comprises a first means for meshing;

said at least one first web comprises a second means for meshing; and said first means for meshing and said second means for meshing being in mesh with one another.

15. The friction clutch according to claim 12, wherein said clutch housing comprises a wall, said wall comprising an inner portion and an outer portion;

said outer portion of said clutch housing being farther from the axis of rotation than said inner portion of said clutch housing;

said outer portion of said clutch housing being concentric with the axis of rotation;

said clutch housing comprises at least one web;

said at least one web having a first end and a second end, said first end and said second end of said at least one web being substantially opposite one another, with respect to one another;

said first end of said at least one web being disposed on said outer portion of said clutch housing;

said second end of said at least one web extending substantially radially inwardly from said first end of said at least one web;

said flywheel assembly comprises an inner portion and an outer portion;

said outer portion of said flywheel assembly being farther from the axis of rotation than said inner portion of said flywheel assembly;

said outer portion of said flywheel assembly being concentric with the axis of rotation;

said flywheel assembly comprises at least one shoulder portion;

said at least one shoulder portion having a first end and a second end, said first end and said second end of said at least one shoulder portion being substantially opposite one another, with respect to one another;

said first end of said at least one shoulder portion being disposed on said outer portion of said flywheel assembly;

said second end of said at least one shoulder portion extending substantially radially outwardly from said first end of said at least one shoulder portion;

said at least one shoulder portion having a circumference;

said at least one shoulder portion comprises:
a first shoulder; and
a second shoulder;

said second shoulder comprises recesses, said recesses being disposed on said circumference of said second shoulder;

said at least one web comprises:
at least one first web having a length dimension; and
at least one second web having a length dimension;

said length dimension of said at least one second web being greater than said length dimension of said at least one first web;

said second end of said at least one first web being substantially adjacent said second end of said first shoulder;

said second end of said at least one first web overlaps said second end of said first shoulder along the axial direction;

said at least one first web comprises a first surface and a second surface, said first surface and said second surface of said at least one first web being disposed substantially opposite one another;

said second shoulder comprises an inner surface and an outer surface, said inner surface and said outer surface of said second shoulder being disposed substantially opposite one another;

said inner surface of said second shoulder faces substantially toward said at least one first web;

said first surface of said at least one first web faces substantially toward said second shoulder;

said plate spring comprises:
 an inner portion;
 a middle portion; and
 an outer portion;

said outer portion of said plate spring being farther from the axis of rotation than said inner portion of said plate spring;

said middle portion of said plate spring being located between said inner portion of said plate spring and said outer portion of said plate spring;

said flywheel assembly comprises means for supporting said plate spring;

said outer portion of said plate spring contacting said first surface of said at least one first web;

said inner portion of said plate spring contacting said inner surface of said second shoulder;

said means for supporting said plate spring comprises:
 said first surface of said at least one first web; and
 said inner surface of said second shoulder;

said at least one first web comprises a plurality of webs; and said at least one second web comprises a plurality of webs.

16. The friction clutch according to claim 12, wherein:

said clutch housing comprises a wall, said wall comprising an inner portion and an outer portion;

said outer-portion of said clutch housing being farther from the axis of rotation than said inner portion of said clutch housing;

said outer portion of said clutch housing being concentric with the axis of rotation;

said clutch housing comprises at least one web;

said at least one web having a first end and a second end, said first end and said second end of said at least one web being substantially opposite one another, with respect to one another;

said first end of said at least one web being disposed on said outer portion of said clutch housing;

said second end of said at least one web extending substantially radially inwardly from said first end of said at least one web;

said flywheel assembly comprises an inner portion and an outer portion;

said outer portion of said flywheel assembly being farther from the axis of rotation than said inner portion of said flywheel assembly;

said outer portion of said flywheel assembly being concentric with the axis of rotation;

said flywheel assembly comprises at least one shoulder portion;

said at least one shoulder portion having a first end and a second end, said first end and said second end of said at least one shoulder portion being substantially opposite one another, with respect to one another;

said first end of said at least one shoulder portion being disposed on said outer portion of said flywheel assembly;

said second end of said at least one shoulder portion extending substantially radially outwardly from said first end of said at least one shoulder portion;

said at least one shoulder portion having a circumference;

said at least one shoulder portion comprises:
 a first shoulder; and
 a second shoulder;

said second shoulder comprises recesses, said recesses being disposed on said circumference of said second shoulder;

said at least one web comprises;
 at least one first web having a length dimension; and
 at least one second web having a length dimension;

said length dimension of said at least one second web being greater than said length dimension of said at least one first web;

said second end of said at least one first web being substantially adjacent said second end of said first shoulder;

said second end of said at least one first web overlaps said second end of said first shoulder along the axial direction;

said at least one first web comprises a first surface and a second surface, said first surface and said second surface of said at least one first web being disposed substantially opposite one another;

said second shoulder comprises an inner surface and an outer surface, said inner surface and said outer surface of said second shoulder being disposed substantially opposite one another;

said inner surface of said second shoulder faces substantially toward said at least one first web;

said first surface of said at least one first web faces substantially toward said second shoulder;

said plate spring comprises:
 an inner portion;
 a middle portion; and
 an outer portion;

said outer portion of said plate spring being farther from the axis of rotation than said inner portion of said plate spring;

said middle portion of said plate spring being located between said inner portion of said plate spring and said outer portion of said plate spring;

said flywheel assembly comprises means for supporting said plate spring;

said outer portion of said plate spring contacting said first surface of said at least one first web;

said inner portion of said plate spring contacting said inner surface of said second shoulder;

said means for supporting said plate spring comprises:
 said first surface of said at least one first web; and
 said inner surface of said second shoulder;

said second end of said first shoulder comprises means for limiting axial movement of said at least one first web;

said second end of said first shoulder comprises a step-shaped portion for contacting said second end of said at least one first web;

said second end of said at least one first web contacting said step-shaped portion of said first shoulder;

said step-shaped portion of said first shoulder comprises said means for limiting axial movement of said at least one first web;

said first shoulder comprises a first means for meshing;

said at least one first web comprises a second means for meshing;

said first means for meshing and said second means for meshing being in mesh with one another;

said first means for meshing comprises teeth; and said second means for meshing comprises teeth.

17. The friction clutch according to claim 12, wherein:

said clutch housing comprises a wall, said wall comprising an inner portion and an outer portion;

said outer portion of said clutch housing being farther from the axis of rotation than said inner portion of said clutch housing;

said outer portion of said clutch housing being concentric with the axis of rotation;

said clutch housing comprises at least one web;

said at least one web having a first end and a second end, said first end and said second end of said at least one web being substantially opposite one another, with respect to one another;

said first end of said at least one web being disposed on said outer portion of said clutch housing;

said second end of said at least one web extending substantially radially inwardly from said first end of said at least one web;

said flywheel assembly comprises an inner portion and an outer portion;

said outer portion of said flywheel assembly being farther from the axis of rotation than said inner portion of said flywheel assembly;

said outer portion of said flywheel assembly being concentric with the axis of rotation;

said flywheel assembly comprises at least one shoulder portion;

said at least one shoulder portion having a first end and a second end, said first end and said second end of said at least one shoulder portion being substantially opposite one another, with respect to one another;

said first end of said at least one shoulder portion being disposed on said outer portion of said flywheel assembly;

said second end of said at least one shoulder portion extending substantially radially outwardly from said first end of said at least one shoulder portion;

said at least one shoulder portion having a circumference;

said at least one shoulder portion comprises:
a first shoulder; and
a second shoulder;

said second shoulder comprises recesses, said recesses being disposed on said circumference of said second shoulder;

said second shoulder comprises means for meshing with said second end of said at least one web, said means for meshing being disposed on said circumference of said second shoulder;

said flywheel assembly comprises a groove, said groove being disposed on said outer portion of Bald flywheel assembly and facing radially outwardly;

said groove being disposed between said first shoulder and said second shoulder;

said plate spring is disposed in said groove;

said flywheel assembly comprises means for permitting manipulation of said plate spring;

said wall of said clutch housing comprises apertures; and said apertures are said means for permitting manipulation of said plate spring.

18. The friction clutch according to claim 12, wherein:

said clutch housing comprises a wall, said wall comprising an inner portion and an cuter portion;

said outer portion of said clutch housing being farther from the axis of rotation than said inner portion of said clutch housing;

said outer portion of said clutch housing being concentric with the axis of rotation;

said clutch housing comprises at least one web;

said at least one web having a first end and a second end, said first end and said second end of said at least one web being substantially opposite one another, with respect to one another;

said first end of said at least one web being disposed on said outer portion of said clutch housing;

said second end of said at least one web extending substantially radially inwardly from said first end of said at least one web;

said flywheel assembly comprises an inner portion and an outer portion;

said outer portion of said flywheel assembly being farther from the axis of rotation than said inner portion of said flywheel assembly;

said outer portion of said flywheel assembly being concentric with the axis of rotation;

said flywheel assembly comprises at least one shoulder portion;

said at least one shoulder portion having a first end and a second and, said first end and said second end of said at least one shoulder portion being substantially opposite one another, with respect to one another;

said first end of said at least one shoulder portion being disposed on said outer portion of said flywheel assembly;

said second end of said at least one shoulder portion extending substantially radially outwardly from said first end of said at least one shoulder portion;

said at least one shoulder portion having a circumference;

said at least one shoulder portion comprises:
a first shoulder; and
a second shoulder;

said second shoulder comprises recesses, said recesses being disposed on said circumference of said second shoulder;

said second shoulder comprises means for meshing with said second end of said at least one web, said means for meshing being disposed on said circumference of said second shoulder;

said flywheel assembly comprises a groove, said groove being disposed on said outer portion of said flywheel assembly and facing radially outwardly;

said groove being disposed between said first shoulder and said second shoulder;

said plate spring is disposed in said groove;

said groove is disposed substantially outside said clutch housing;

said flywheel assembly comprises means for permitting manipulation of said plate spring;

said wall of said clutch housing comprises apertures; and said apertures are said means for permitting manipulation of said plate spring.

* * * * *

UNITED STATES PATENT AND TRADEMARK OFFICE
CERTIFICATE OF CORRECTION

PATENT NO. : 5,839,560
DATED : November 24, 1998
INVENTOR(S) : Jörg SUDAU

It is certified that error appears in the above-identified patent and that said Letters Patent is hereby corrected as shown below:

In column 5, line 28, after 'recesses' insert --14.--.

In column 5, line 45, after 'housing', delete "31" and insert --3,--.

In column 7, line 4, after 'disc', delete "61" and insert --6,--.

In column 17, line 57, Claim 17, after 'of', delete "Bald" and insert --said--.

In column 18, line 3, Claim 18, after the second occurrence of 'an', delete "cuter" and insert --outer--.

Signed and Sealed this

Twenty-ninth Day of June, 1999

Attest:

Q. TODD DICKINSON

*Attesting Officer*     *Acting Commissioner of Patents and Trademarks*